(12) United States Patent
Wilt (10) Patent No.: US 7,188,047 B2
(45) Date of Patent: *Mar. 6, 2007

(54) SYSTEM AND METHODS FOR PROVIDING HISTOGRAM COMPUTATION IN A HIGH PRECISION RASTERIZATION DATA PIPELINE

(75) Inventor: Nicholas P. Wilt, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/209,954

(22) Filed: Aug. 23, 2005

(65) Prior Publication Data

US 2005/0281460 A1  Dec. 22, 2005

Related U.S. Application Data

(63) Continuation of application No. 11/054,915, filed on Feb. 9, 2005, now Pat. No. 7,010,458, which is a continuation of application No. 09/960,758, filed on Sep. 21, 2001, now Pat. No. 6,917,899.

(51) Int. Cl.
*G06F 15/00* (2006.01)
(52) U.S. Cl. .................. 702/180; 382/261; 712/26
(58) Field of Classification Search ................ 702/180, 702/75, 76, 78, 79, 176, 178; 382/261; 358/448; 711/100, 167; 712/26, 255
See application file for complete search history.

(56) References Cited

U.S. PATENT DOCUMENTS

5,563,962 A  10/1996  Peters et al. ................ 382/261

*Primary Examiner*—Edward Raymond
(74) *Attorney, Agent, or Firm*—Woodcock Washburn LLP (57) ABSTRACT

A system and methods for implementing histogram computation, for example, into the rasterization pipeline of a 3-D graphics system, are provided. With the histogram computation mechanism, statistical histogram data may be generated for input data of any kind or retrieved from any source that may be specified in a 2-D array or specified in an immediate fashion to specialized data processing hardware. Depending on the nature of the input data, the data may be filtered before passing the data to data processing hardware for further processing. The data processing hardware may then apply an additional function to the input data set before calculation of the histogram data. Then, at some point, the data processing hardware may apply a function to the data to map the derived data to a real-valued function that can then be quantized to a histogram element in the range specified from zero to the number of histogram elements minus one. The corresponding element in this histogram is then incremented according to the data received as it passes through the graphics processor. Advantageously, relatively expensive host computing resources are conserved, and developers are insulated from the tedious details required of implementing histogram computation from the ground up each time it becomes desirable to compute histogram data in connection with an application.

17 Claims, 5 Drawing Sheets

```
HRESULT ResetHistogram();                                              410

HRESULT SetHistogramState( D3DHISTSTATE StateToSet, DWORD dwStateValue );

typedef enum _D3DHISTSTATETYPE    415
{
    D3DHIST_SIZE,           // number of elements in the histogram
                            // actual count is 2 more for below-min and above-max
    D3DHIST_FMIN,           // (float)
    D3DHIST_FMAX,           // (float)
    D3DHIST_FUNCTION        // function to map fragment to histogram element index
} D3DHISTSTATETYPE;
```

```
//
// Different ways to histogram a fragment color
//
#define D3DHISTFUNCTION_R       1
#define D3DHISTFUNCTION_G       2
#define D3DHISTFUNCTION_B       3
#define D3DHISTFUNCTION_A       4
#define D3DHISTFUNCTION_YUVY    5
#define D3DHISTFUNCTION_YUVU    6
#define D3DHISTFUNCTION_YUVV    7
```

FIG. 5

SYSTEM AND METHODS FOR PROVIDING HISTOGRAM COMPUTATION IN A HIGH PRECISION RASTERIZATION DATA PIPELINE

CROSS REFERENCE TO RELATED APPLICATIONS

This application is a continuation of U.S. application Ser. No. 11/054,915, filed Feb. 9, 2005, which is a continuation of U.S. application Ser. No. 09/960,758, filed Sep. 21, 2001, which is hereby incorporated by reference in its entirety.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document Copyright © 2000, Microsoft Corp.

FIELD OF THE INVENTION

The present invention relates to the provision of histogram computational ability in a computing device or system. More particularly, the present invention relates to the provision of a histogram computation mechanism in a high precision rasterization data pipeline.

BACKGROUND OF THE INVENTION

Statisticians, data analysts, etc. work with different representations of data sets in order to extract various features of the data not obvious from the raw data set alone. One such data representation that may be formed is a histogram. In a typical visually represented form, a histogram is a statistical graph, e.g., a bar graph, showing a frequency distribution, or some function thereof, in which the heights of vertical rectangles are proportionate to corresponding frequencies. In the context of image processing, histograms are often used to characterize image intensities, color, frequency content, and other characteristics of the image data or some derivative function of the image data. A suitable representation of a histogram for purposes of forming, storing and processing in digital computers is an array of counts, with each array element corresponding to a vertical rectangle in the graphical histogram, e.g., to occurrences of a particular intensity, color, frequency, etc. For example, an array of 256 elements [0 . . . 255] could hold the counts for each of the 256 possible gray scale pixel values in an 8-bit image. Many other statistics relating to the pixel values can be derived from or are calculated incident to such a histogram generation as well, including the number of pixels and the minimum, maximum, average and median pixel values. Additionally, function results or data sets derived from image data, such as the difference between two images, also may be statistically characterized by a histogram. Further, a histogram may be computed for any data set, not just for image data and derivatives of image data, such as a data set representing a certain population and corresponding ages, heights, weights, eye color and/or any characteristic that may describe the population in some way.

With increased sophistication and complexity of image processing in today's graphics applications and processes, a number of problems arise with histogram implementation. A main problem is that the size of the array needed to represent an exhaustive histogram increases exponentially with the precision of the values being characterized; for example, while a histogram for an 8-bit image requires a 256 ($2^8$) element array, the histogram for a 16-bit image requires 65,536 ($2^{16}$) values. Besides the hardware costs of maintaining these large arrays, proportionately more computation power is needed to process them; and if the histograms are computed by hardware components other than the host processor, the cost of copying histogram arrays into memory accessible by the host for further processing also increases proportionately.

With the advent of higher precision for pixel representation and programmable shading languages that enable complex computations to be performed on pixel data, it is becoming more and more desirable to compute histograms for intermediate processing results, which may or may not be pixel data, with much higher precision and speed. For example, commonly assigned copending U.S. patent application Ser. No. 09/801,079, filed Mar. 6, 2001, entitled "API Communications for Vertex and Pixel Shaders" (the '079 application) describes systems and methods employing such complex programmable shading language for communicating with specialized hardware implementations of vertex shaders and pixel shaders. Communications are provided for vertex shaders that may make use of a register index and that enable direct access to communications included within the graphics chip itself Communications are also provided for specialized functionality implemented on-chip at a register level for increased processing speed and decreased memory transfer time between host and chip. Further, communications are provided for pixel shaders for specialized functionality, also implemented on-chip at a register level, including linear interpolation functionality and various modification functionality including negating, complementing, remapping, biasing, scaling and saturating. Advantageously, with the system of the '079 application, the communications expose very useful on-chip graphical algorithmic elements to a developer while hiding the details of the operation of the vertex shader and pixel shader chips from the developer. Many of these functions implicate the very fast processing of data as it is passed through a graphics chip, bypassing the main memory stack and relatively slow processing of the host processor; however, the '079 application does not specifically describe the provision of a low cost, high speed histogram computation mechanism.

To further illustrate the current problems of histogram computation in connection with today's graphics applications, it may be instructive to understand the volumes of data associated with image processing applications. With many modern three dimensional (3-D) graphics systems, 3-D shapes are created by connecting a number of two-dimensional (2-D) polygons and curved surfaces are represented by connecting many small polygons. The view of a 3-D shape composed of polygon outlines is called a wire frame view. In sum, the computer creates 3-D objects by connecting a number of 2-D polygons. Before the 3-D object is ultimately rendered on a 2-D display screen, however, the data of a sophisticated graphics object undergoes many different mathematical transformations that implicate considerably specialized equations and processing unique to 3-D representation.

Early systems could only ascribe a single value to shading parameters and hence they remained constant and uniform across the entire surface of the object. Later systems allowed for the use of non-uniform parameters, transparency for instance, which might have different values over different parts of the object. Two prominent and distinct techniques have emerged to describe the values taken by these non-uniform parameters on the various parts of the object's surface: procedural shading and texture mapping. Texture mapping is pixel based and resolution dependent.

Procedural shading describes the appearance of a material at any point of a one dimensional (1-D), 2-D or 3-D space by defining a function, often called the procedural shader, in this space into shading parameter space. The object is "immersed" in the original 1-D, 2-D or 3-D space and the values of the shading parameters at a given point of the surface of the object are defined as a result of the procedural shading function at this point. For instance, procedural shaders that approximate appearance of wood, marble or other natural materials have been developed and can be found in the literature.

The rendering of graphics data in a computer system is thus a collection of resource intensive processes on volumes of 3-D data. The process of shading, i.e., the process of performing complex techniques upon set(s) of specialized graphics data structures, used to determine values for certain primitives, such as color, etc., associated with the graphics data structures, exemplifies such a computation intensive and complex process. For each developer to design these shading techniques for each program and/or for each developer to design each program for potentially varying third party graphics hardware would be a Herculean task, and would produce much inconsistency. The '079 application, described above, thus solves such a problem in connection with specialized procedural shading applications. However, there remains a need to remove the programming of complex histogram computational ability from the task list of the developer, and to move such functionality into the graphics pipeline itself.

While there are some prior art systems that provide limited statistical analysis on data, these systems implement pre-fixed functionality upon data for a predetermined reason, and consequently are hard-wired and immutable and thus do not offer the flexibility to analyze data from a variety of histogram perspectives. For example, translation boards exist that perform pre-fixed functionality on input data, which operate in the same way on an input data set, and which implement the same fixed function from an output perspective. Additionally, with those systems, the input data is limited to 8-bit gray scale pixel data.

A system is also known wherein one or more registers are implemented that keep track of passed-failed counts of z-buffer comparisons. However, with that system, not only is the implementation of a pre-fixed type, but also the resulting data set could not be accessed except through the use of a complex proprietary mechanism, further restricting the flexibility of the system.

Thus, there is a need for a way to incorporate histograms of variable precision into complex image processing pipelines such as those implemented by 3-D rasterization hardware. Further, since the internal precision of such hardware is typically 9 bits today and is anticipated to increase to 16 or more bits in the near future, and since such hardware may be separated from the host processor by a bus with limited data throughput, it would be desirable to provide a method for computing a smaller histogram that statistically characterizes input data while conserving the amount of data computed, transferred and processed. It would be further desirable to provide for such histogram functionality on a graphics chip, such that as data is streamed through the data rasterization pipeline, for display or storage, statistical histogram data may be extracted at the same time. It would be still further desirable to provide the ability to specify a mask for application to histogram data, either to the input data itself before histogram computation, or to the resulting histogram data in order to extract the most relevant data from the input data set.

SUMMARY OF THE INVENTION

In view of the foregoing, the present invention provides a system and methods for implementing histogram computation, for example, into the rasterization pipeline of a 3-D graphics system. In accordance with the invention, statistical histogram data may be generated for input data of any kind or retrieved from any source that may be specified in a 2-D array or specified in an immediate fashion to specialized data processing hardware. Depending on the nature of the input data, the data may be filtered before passing the data to data processing hardware for further processing. The data processing hardware may then apply an additional function to the input data set before calculation of the histogram data. Then, at some point, the data processing hardware may apply a function to the data to map the derived data to a real-valued function that can then be quantized to a histogram element in the range specified from zero to the number of histogram elements minus one. The corresponding element in this histogram is then incremented according to the data received as it passes through the graphics processor. Advantageously, relatively expensive host computing resources are conserved, and developers are insulated from the tedious details required of implementing histogram computation from the ground up each time it becomes desirable to compute histogram data in connection with an application.

In various embodiments, the present invention provides systems and methods for providing histogram computational ability in a computing system having a plurality of data sets transmitted through processing chip(s) for performing high speed data operations. The systems and methods include specifying data set(s) for histogram computation via a histogram computation mechanism implemented by the processing chip(s) and computing at least one histogram from the specified data set(s) as the data set(s) transmit through the processing chip(s). In other embodiments, the present invention provides a computer readable medium having stored thereon a plurality of computer-executable modules including a histogram computation specification mechanism for specifying data set(s) to be operated upon by one or more processing chips, wherein the one or more chips include a histogram computation mechanism for computing at least one histogram from the data set(s) as the data set(s) are transmitted through the one or more chips during processing of the data set(s) in connection with a high precision data pipeline. In still further embodiments, the present invention provides an application programming interface, stored as computer-executable instructions on a computer readable medium, for specifying at least one histogram to be computed from data set(s) as the data set(s) are transmitted through a high precision data pipeline. The application programming interface includes a histogram computation specification mechanism for specifying the data set(s) to be operated upon by one or more processing chips of the high precision data pipeline, wherein the one or more chips include a histogram computation mechanism for computing, based upon a specification according to the histogram computation specification mechanism, at least one histogram from the data set(s) as the data set(s) are transmitted through the one or more chips during processing of the data set(s).

Other features and embodiments of the present invention are described below.

BRIEF DESCRIPTION OF THE DRAWINGS

The system and methods for providing histogram computation in a rasterization pipeline of a 3-D graphics system are further described with reference to the accompanying drawings in which.

DETAILED DESCRIPTION OF ILLUSTRATIVE EMBODIMENTS

Overview

The present invention provides a system and methods for incorporating histogram computation into the rasterization pipeline of a 3-D graphics system. Upon being received by a graphics chip, input data that may be specified in a 2-D array or specified in an immediate fashion to the graphics hardware may be filtered before passing the data to the rest of the graphics processor for further processing. The graphics processor may take the input data and generate derivative data. At some point during the processing of the derived data, the graphics processor applies a function to the data to map the derived data to a real-valued function that can then be quantized to a histogram element. The corresponding element in the histogram is then incremented according to the data received as it passes through the graphics processor. Advantageously, the present invention allows histogram computation to be performed in a fast and efficient manner. As data passes through the graphics chip for processing, histograms may be computed based on some function of the data, avoiding the computationally expensive general host processing, and avoiding otherwise expensive data transfer to and from main memory to the graphics chip.

Exemplary Network Environments

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Figure 1:
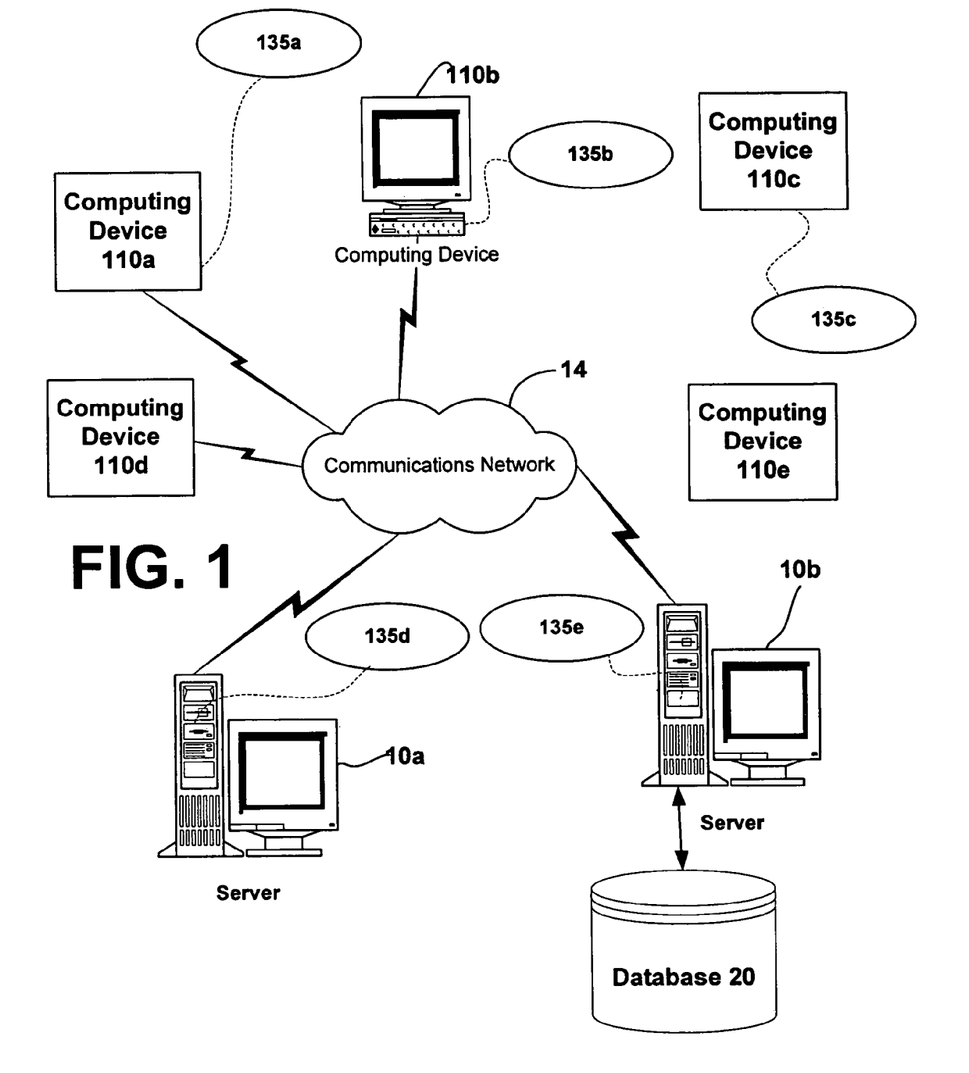
FIG. 1 is a block diagram representing an exemplary network environment having a variety of computing devices in which the present invention may be implemented.

FIG. 1 illustrates an exemplary network environment, with a server in communication with client computers via a network, in which the present invention may be employed.

As shown, a number of servers 10a, 10b, etc., are interconnected via a communications network 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, and the like in accordance with the present invention. It is thus contemplated that the present invention may apply to any computing device in connection with which it is desirable to compute histograms from or for a data set.

In a network environment in which the communications network 14 is the Internet, for example, the servers 10 can be Web servers with which the clients 110a, 110b, 110c, 110d, 110e, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 135 and with connections or access to various types of storage elements or objects, across which files may be stored or to which portion(s) of files may be downloaded or migrated. Any server 10a, 10b, etc. may be responsible for the maintenance and updating of a database 20 or other storage element in accordance with the present invention, such as a database 20 for storing software interoperable with the histogram computation ability of the present invention. Thus, the present invention can be utilized in a computer network environment having client computers 110a, 110b, etc. that can access and interact with a computer network 14 and server computers 10a, 10b, etc. that may interact with client computers 110a, 110b, etc. and other devices 111 and databases 20.

Exemplary Computing Device

Figure 2:
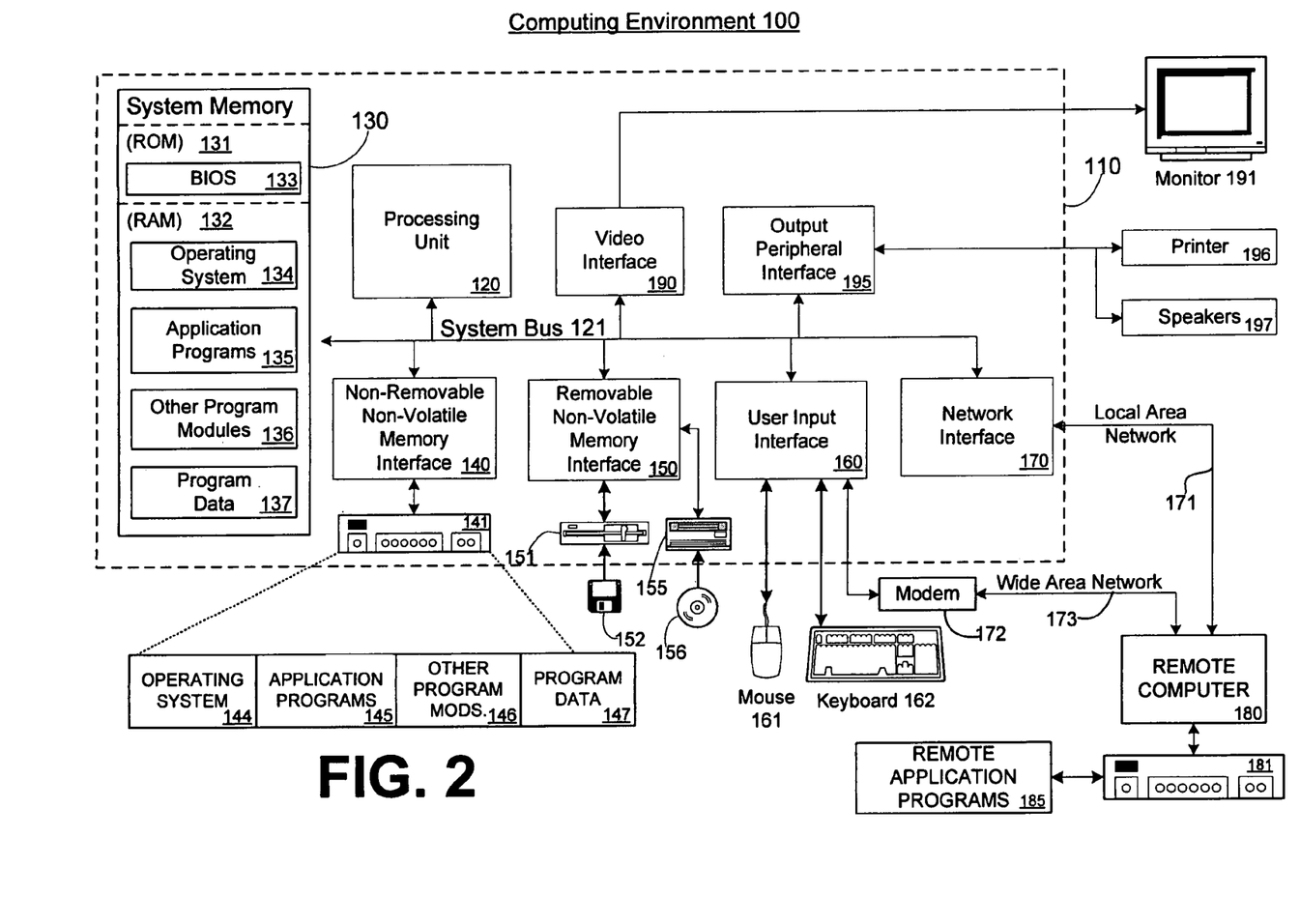
FIG. 2 is a block diagram representing an exemplary non-limiting computing device in which the present invention may be implemented.

FIG. 2 and the following discussion are intended to provide a brief general description of a suitable computing environment in which the invention may be implemented. It should be understood, however, that handheld, portable and other computing devices of all kinds are contemplated for use in connection with the present invention. While a general purpose computer is described below, this is but one example, and the present invention requires only some kind of graphics pipeline with a specialized graphics chip. Additionally, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, which will be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, minicomputers, mainframe computers and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 2 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Computer 110 may also include specialized graphics chip(s) for fast processing of image data, and the histogram computation mechanism of the present invention maybe included within such a graphics, or other specialized, data processing chip.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

.NET Framework

.Net is a computing framework that has been developed in light of the convergence of personal computing and the Internet. Individuals and business users alike are provided with a seamlessly interoperable and Web-enabled interface for applications and computing devices, making computing activities increasingly Web browser or network-oriented. In general, the .Net platform includes servers, building-block services, such as Web-based data storage and downloadable device software.

Generally speaking, the .Net platform provides (1) the ability to make the entire range of computing devices work together and to have user information automatically updated and synchronized on all of them, (2) increased interactive capability for Web sites, enabled by greater use of XML (Extensible Markup Language) rather than HTML, (3) online services that feature customized access and delivery of products and services to the user from a central starting point for the management of various applications, such as e-mail, for example, or software, such as Office .Net, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well. While exemplary embodiments herein are described in connection with an application programming interface (API) for a particular programming language, the histogram computation ability of the present invention may be supported in or accessed through all of Microsoft's NET languages.

Histogram Computation in a High Rasterization Pipeline

For exemplary purposes, the present invention presents the statistical characterization of a real-valued function rather than the characterization of discrete functions more frequently encountered in image processing, although it may be appreciated by one of ordinary skill in the art that discrete functions are also subject to histogram characterization. To characterize a set of function values using an N-element histogram, where N is a positive whole number, each function value is first quantized in order to select and increment one of the N elements.

For an exemplary histogram computation relating to an image, let $f(x)$ be the intensity of a pixel value, the angle estimated by a set of convolution operators, or some other function that is to be characterized statistically using an N-element histogram. Let $f_{min}$ be the minimum value to be considered by the histogram; let $f_{max}$ be the maximum value. One method for selecting a histogram element is a linear quantization of the desired range, wherein:

HistElementIndex=Floor$(((f(x)-f_{min})/(f_{max}-f_{min}))*N)$ where Floor is a function that returns the largest integer that is less than or equal to the input value.

A variety of policies to deal with out-of-range input values can be implemented. One would be to ignore values that are outside the range. Another would be to allocate 2 extra histogram elements, one for values below $f_{min}$ and one for values above $f_{max}$, and increment them for corresponding out-of-range function values. These below $f_{min}$ and above $f_{max}$, histogram values would be useful for detecting when the $f_{min}$ and $f_{max}$ values are not ideal for analyzing the pixel data in question, e.g., when too much of the data is concentrated either below $f_{min}$ or above $f_{max}$.

Figure 3:
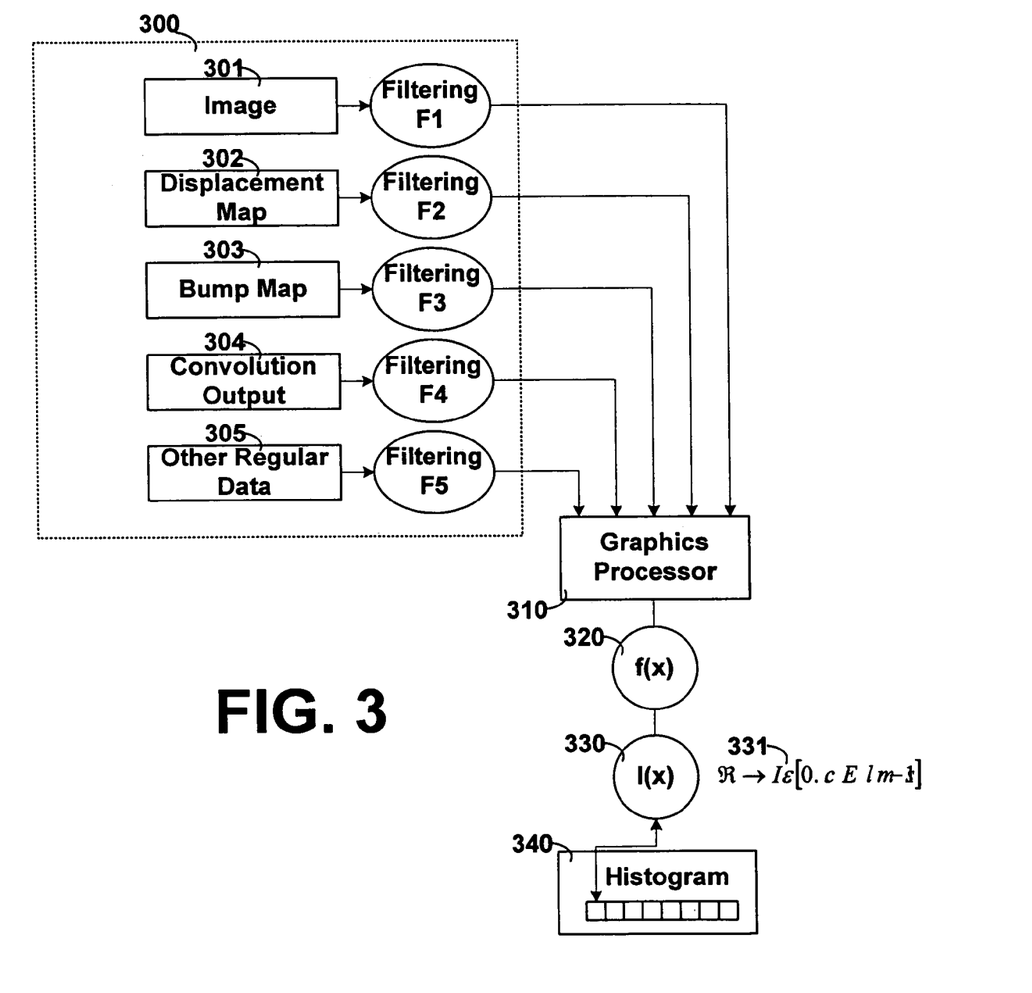
FIG. 3 is a block diagram of an exemplary implementation of the present invention in an image processing system.

FIG. 3 depicts a simplified block diagram of an exemplary implementation of the present invention in an image processing system, although the invention is not so limited. The regular input data 300 may constitute image or texture map data 301, displacement map data 302, bump map data 303, convolution output data 304, and/or other regular data that may be specified in a 2-D array or specified in an immediate fashion to the hardware. Depending on the nature of this regular data, the hardware may optionally filter the data via filters F1, F2, etc. before passing the data to the rest of the graphics processor for further processing i.e., the input data may be a filtered version of the original data. The graphics processor 310 may then take the input data 300 and generate derivative data, such as interpolated or blended image data. At some point during the processing of this data, the graphics processor 310 applies a function f(x) 320 to the data to map the derived data to a real-valued function that can then be quantized 330 to a histogram element in the range 0 to the number of histogram elements minus one, inclusive, as called out in the equation 331. The corresponding element in this histogram 340 is then incremented according to the data received as it passes through the graphics processor 310.

The application of a function f(x), such as a thresholding function, at 320 is optional and one of ordinary skill in the art can appreciate that the input data may be directly transmitted to quantizer 330 for histogram computation without the application of an additional function f(x). The function f(x) nonetheless provides considerable flexibility when deciding for which data to generate a histogram. For example, for some application, it might be decided that f(x) may implement a fast fourier transform (FFT) in order to discover the frequency content of an image for purposes of making a decision about whether there are a lot of edges in an image. For another application, e.g., a black and white image application, it might be desirable to histogram the image data directly without first performing a function f(x) on the data, for instance to increase image clarity by determining the breadth of gray scale utilized by a particular image for the purpose of shifting the use of gray scale to underutilized shades of gray. In short, there are millions of reasons one might want to compute a histogram on a data set, or a derivative function of that data set, and the present invention provides a low cost, fast solution for doing so as the data is passed through a graphics processor 310, or the like.

Exemplary Implementations of the Histogram Computation Mechanism

Commonly assigned U.S. patent application Ser. No. 09/777,644, filed Feb. 6, 2001, entitled "A System and Method for Performing Sparse Transformed Template Matching Using 3D Rasterization" (the '644 application) describes another exemplary system in connection with which the present invention may be implemented. For example, with that invention, methods for comparing and matching a first set of digital data to a second set of digital data are described in which during the raster transformation of the first and second sets of digital data, multiple images of the digital data are placed in texture memory as multiple textures. Then, statistics are gathered concerning the textures, and the raster transformed sets of digital data are compared and matched against corresponding portions of each other. In this regard, the '644 application describes a system having host processor, a texture memory for textures, and a graphics processing chip having an address generator, an acceptance tester and a statistics comparison device in various implementations of the methods. Advantageously, the statistical comparisons and matching processing of the methods are provided as part of the rasterization pipeline, and the data extracted from the processes may be recorded for normalized correlations or variations, and for subsequent forwarding to a host processor or alternate processing system interested in the data. Thus, as the data is passed through the rasterization pipeline, statistics between the textures can be gathered for added flexibility. The present invention furthers such efforts by enabling the flexible definition of and subsequent computation of histogram data for data sets passed to the rasterization processor or other specialized data processing chip.

In another non-limiting example, the specialized histogram computation of the present invention, once implemented at the chip level as described above for minimization of data transfer and computation time, may be accessed from the developer, or application, standpoint via an application programming interface. Thus, for instance, while a non-limiting application to graphics applications, a programmable shading language for 3-D graphics hardware in DIRECTX®, in conjunction with a mechanism for reading data back from the 3-D graphics hardware, provides a good context for implementing the histogram computation of the present invention. The DIRECT3D® device, which may represent a hardware and/or software component, contains state that may be controlled through the DIRECT3D® API; this state can be augmented in accordance with the present invention to contain the histogram(s) and state that describes how to operate on them. The rasterization shading language in DIRECTX® may also be augmented according to the invention so that shaders include a histogram increment operation that specifies on which histogram to operate, which fragment to use as input to the histogram increment operation, and how to map the fragment value to a histogram element index. Some of this information is more appropriately specified as part of the device state, e.g. via the SetRenderState( ) interface construct, rather than in the shader, although this distinction is largely semantic because the shader and device state are typically mapped together onto flexible, fixed function hardware. In other words, the shader can be thought of as a convenient programming construct for an extremely complicated piece of hardware.

In exemplary descriptions that follow, ways of exposing a single histogram in DIRECTX® programmable shader language are described. In an exemplary implementation, a histogram may have the following state values associated with it: uElement, cElements, fMapping, $f_{min}$ and $f_{max}$. uElement is defined to be an array of elements or counts for storage of the histogram, e.g. defined by the range of elements to count [0..MaxElements-1]. cElements is defined to be the number of elements in or represented by the histogram. fMapping is defined as the function to map fragment values e.g., ARGB, to histogram element indices. $f_{min}$ and $f_{max}$ are values used in conjunction with fMapping to turn fragment colors into histogram element indices.

Figure 4:
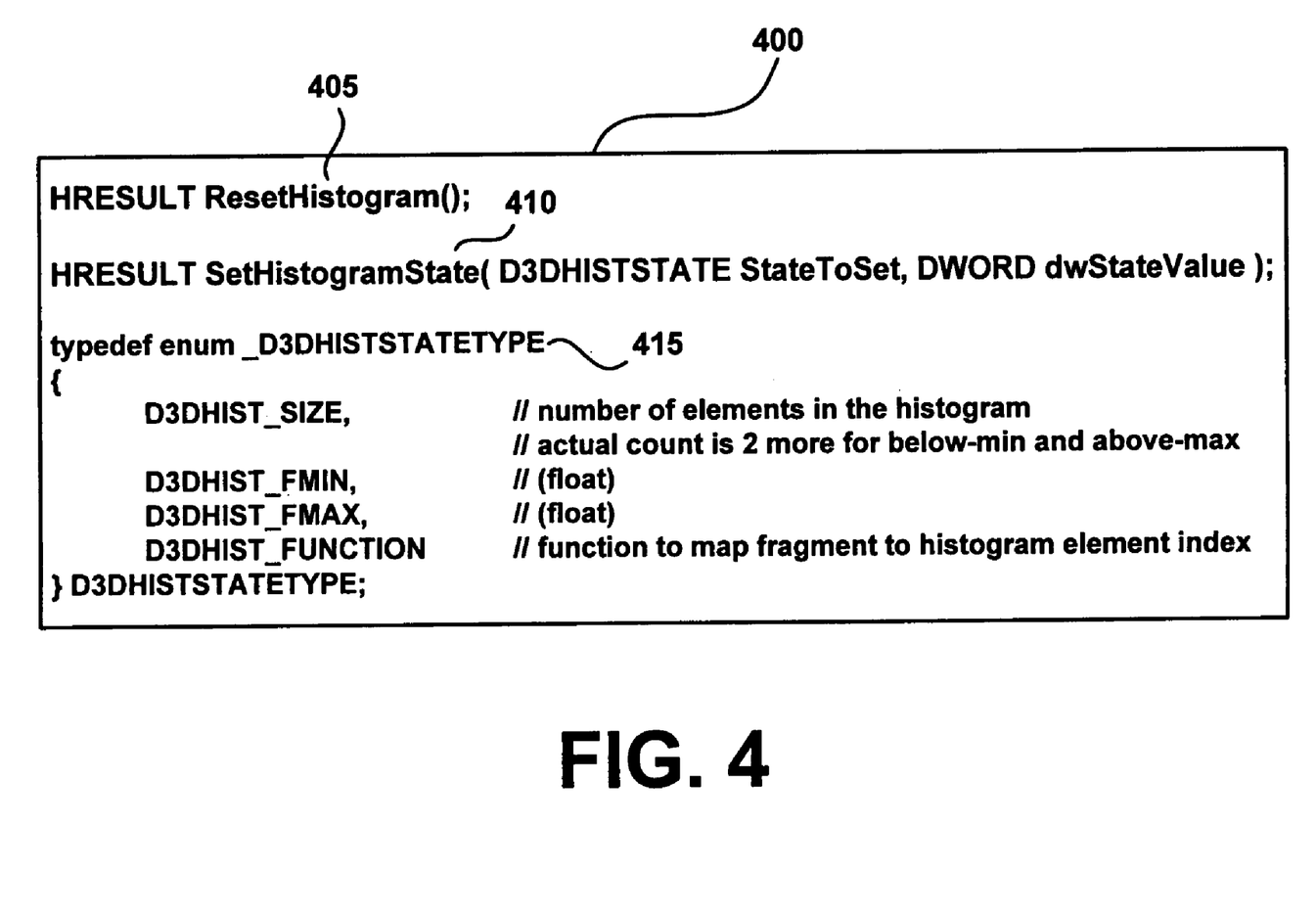
FIG. 4 illustrates methodology for the setting or resetting of histogram parameters via programming constructs in accordance with the present invention.

FIG. 4 illustrates exemplary syntax 400 for the setting or resetting of histogram parameters via an API in accordance with the present invention. In the exemplary embodiment, histogram state values can be set or reset with two new methods of the IDirect3D8Device API, namely ResetHistogram 405 and SetHistogramState 410 with the associated syntax. The method ResetHistogram 405 initializes the histogram element values to zero. The first parameter of the method SetHistogramState 410 specifies the state to set. An exemplary definition for this parameter is an enumeration that specifies the different states described above in connection with uElement, cElements, fMapping, $f_{min}$ and $f_{max}$. The specification of _D3DHISTSTATETYPE 415, for instance, represents an exemplary implementation of these different states to set.

The method SetHistogramState 410 is similar to the existing SetRenderState call of the IDirect3D8Device API in that depending on the first parameter, the second parameter specifies the corresponding state of the appropriate type for that state. For example, the call:

pD3DDevice->SetHistogramState(D3DHIST_SIZE, 256);

sets the histogram size to 256 and the following exemplary pseudocode:

float fOne=1.0 f;
pD3DDevice->SetHistogramState(D3DHIST_FMAX, *((DWORD*)fOne));

sets the $f_{max}$ value to a floating-point zero.

Figure 5:
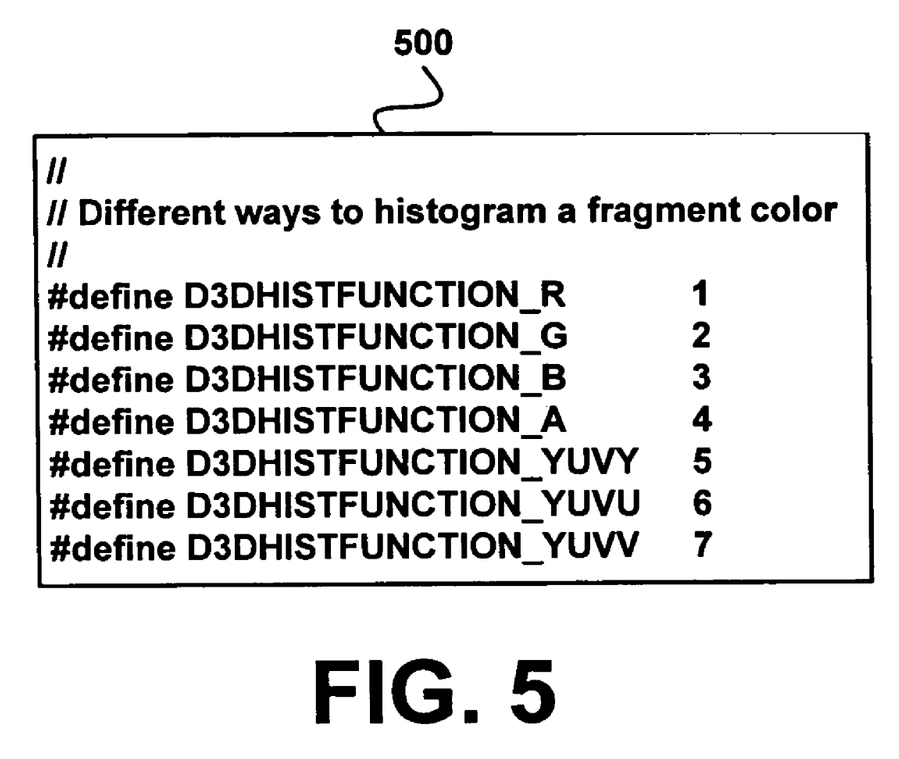
FIG. 5 represents exemplary pseudocode illustrating different ways to histogram a fragment color in accordance with a working example for describing the invention.

If the first parameter is D3DHIST_FUNCTION, an enumeration could select from a variety of functions that map a fragment value to a histogram element index. For example, pseudocode 500 of FIG. 5 illustrates different ways to histogram a fragment color.

Thus, the above-described syntax illustrates one way that the histogram computation functionality of the present invention can be exposed to a developer, application, or process that interacts with a graphics chip having a histogram computation mechanism, as may be implemented in a graphics chip.

In terms of a shader programming language, as might be implemented as described in the '079 application, a new shader instruction HIST may be implemented in accordance with the present invention that has the following syntax:

hist tSrc;

The use of this programming construct maps a fragment value from tSrc to a histogram element index to the histogram function and histogram size specified by the D3DHIST_SIZE and D3DHIST_FUNCTION states, and increments the corresponding histogram element. When this instruction is encountered in the instruction stream, the color is read from the tSrc and the histogram state is used to map that fragment to a histogram element index and increment the corresponding element of the histogram. One possible implementation of this mapping, e.g. for the D3DHISTFUNCTION_R element of FIG. 5, might be as follows:

x=Fragment$_{RED}$
HistSize, x<$f_{min}$
HistElementIndex=HistSize+1, x>$f_{max}$
((x-$f_{min}$)/($f_{max}$-$f_{min}$))*HistSize, $f_{min} \leq x \leq f_{max}$ The histogram element corresponding to HistElementIndex would then be incremented. In this example, the two histogram elements following the first HistSize elements correspond to the below minimum and above maximum function values. A more complicated transform, such as the D3DHISTFUNCTION_YUVY element of FIG. 5, could be implemented to transform the color fragment to the YUV color space and then histogram the Y (luminance) component, as follows:

x=(0.257*Fragment$_{RED}$)+(0.504*Fragment$_{GREEN}$)+ (0.098*Fragment$_{BLUE}$)
HistSize, x<$f_{min}$
HistElementIndex=HistSize+1, x>$f_{max}$
((x-$f_{min}$)/($f_{max}$-$f_{min}$))*HistSize, $f_{min} \leq x \leq f_{max}$ Another useful variant may be to histogram convolved color data, for example, a fragment generated by convolving an edge detection kernel with the texture data. The input to the histogram quantization algorithm would then be a gradient strength or gradient angle, rather than a color. The possibilities are endless when one is able to flexibly a function of a data set for which a histogram is desirable. Thus, these and other numerous examples not mentioned herein, illustrate the flexibility with which a developer, or application, may utilize the histogram functionality of the present invention to collect statistical information about any aspect of a data set that may be of interest, without incurring host processing and memory transfer overhead, and without burdening the developer to write histogram specific code from the ground up.

The present invention also provides a way to read back data from the histogram computation process at various points in the process, based upon calls to the graphics processing chip. Once the histogram state and the pixel shader that included the hist instruction have been set up, e.g., according to the above-described programming constructs, the application may specify texture mapped triangles using standard DIRECT3D® calls and the resulting color fragments are statistically characterized on a per fragment, per-texel or per-pixel basis. This process may not even result in pixel output, i.e., the alpha blending stage might be disabled to maximize performance or the like. After some number of triangles have been "drawn" and histogrammed by this process, the histogram data may then be read back by calling another method off the DIRECT3D® device. Exemplary syntax for such a method includes:

HRESULT GetHistogramData(PUINT pOut, HEVENT hevReady);

This method causes the histogram data to be copied to the memory pointed to by pOut. Although provision could be made for synchronous operation, advantageously, in an exemplary implementation, the event provides for asynchronous operation, i.e., the function returns immediately and signals the event when the data is copied. When the application needs the data, the application can wait on the event. Many other methods of asynchronous operation could also be enabled, including completion ports, polling, or callback based methods. There may be contexts where synchronous operation is preferred, as well. In such a case, the GetHistogramData function would block until the requested data had been copied.

One of ordinary skill in the art will recognize that while the above-described implementations include the idea of allocating two extra histogram elements to count values that are below $f_{min}$ and above $f_{max}$, and therefore do not make provision for these histogram elements to be omitted, the system could also be designed so as to omit or ignore values that are below $f_{min}$ and above $f_{max}$.

Multiple Histograms, Setting Histogram State and Alternate Incrementing Processes Thus, the above text has described exemplary methodology behind setting up or defining a histogram for computation, and the methodology behind retrieving histogrammed data. With these concepts as building blocks, the present invention also recognizes that there are ways to extend the methods to enable multiple histogram computation, in parallel or simultaneously.

For instance, the above-described methods for adding histogram support to DIRECT3D® can be extended to N histograms by adding a histogram index parameter to the methods ResetHistogram, SetHistogramState and GetHistogramData, and to the hist instruction in the pixel shading language. The histogram index may be an integer indicating which histogram to use. In this way, multiple fragments participating in the rasterization process could be statistically characterized by histograms, since often there are multiple features of interest to extract from data. With the ability to define the function of the data to histogram, very different histograms can be computed at the same time from the same original data set.

The present invention-further recognizes that there are other ways of setting histogram state. For the purposes of simplicity, the above description specified a ResetHistogram method that sets the histogram elements to zero. In some contexts, it may make sense to enable more elaborate ways to set or reset the histogram elements, such as specifying an array of counts and their corresponding values in advance of histogram computation.

The present invention still further recognizes that there is a great deal of flexibility in deciding how to weight a count when received for addition to a histogram. For example, this may be accomplished by adding a tent function instead of incrementing a single bucket by a single count. For instance, rather than blindly mapping the input values to a single histogram index and incrementing the corresponding histogram element by one, a more elaborate histogram computation may be appropriate in some contexts. For example, a tent function could be applied to the histogram elements, adding larger values to elements that correspond more closely to the function value and smaller values to neighboring elements. Additionally, rather than weighting each count the same, one can implement a system in which the amount added to the histogram element varies according to some weighting factor computed separately for the piece of data contributing to the histogram. For example, if the color value includes an alpha component, the alpha component could be added to the appropriate histogram element, causing additions to the histogram to be importance-weighted according to the alpha value. Of course, the value to add to the histogram element could be computed using some arbitrary function applied to the input value, and said function need not be related to the function used to select the histogram element to increment.

A Walk Through Example Using the Invention in the Context of the Hough Transform Commonly assigned U.S. patent application Ser. No. 09/754,865, filed Jan. 4, 2001, entitled "Hough Transform Supporting Methods and Arrangements" (the '865 application) describes a well-known computer vision algorithm called the Hough transform that can be implemented to robustly detect a wide variety of features such as lines, circles, and anything else that can be readily parameterized or otherwise cast in terms of a discrete popularity algorithm. Unfortunately, the Hough transform tends to be computationally intensive. Many personal computer (PC) microprocessors are unable to provide the requisite processing capability usually associated with the Hough transform. This is more true for video that often requires frame rates of about twenty frames or more per second, novel user interfaces using computer vision such as the puppeteering of avatars in online scenarios (e.g., during massively multiplayer games, virtual teleconferencing, and the like), and feature extraction for subsequent image processing (e.g., image registration).

In recognition of the need for improved methods and arrangements that support the use of Hough transforms, and/or any similar transform, the '865 application provides various improved methods and arrangements that leverage the dedicated hardware of a graphics circuit (e.g., a 3-D graphics accelerator card, etc.) to provide a portion of the data processing associated with the Hough transform. In various embodiments, the '865 application describes gathering observations that can be mapped into a parameter space of a desired feature or features, quantizing the parameter space of the desired feature(s), and allocating an accumulator and initializing it to zero for each discrete quantized parameter combination. Then, for each observation, the '865 application further describes incrementing all of the accumulators that correspond to parameter combinations that might have produced the observation, and finding maxima in the quantized parameter array.

Per various methods and arrangements described in the '865 application, the basic processes implicated by the Hough transform are selectively performed by a general-purpose processor along with the dedicated hardware of the graphics circuit. By way of example, in certain implementations, the dedicated graphics hardware provides an alpha-blending capability that can be leveraged to record votes associated with the Hough transform.

In furtherance of the techniques described in the '865 application, the flexibility of the present invention may additionally be illustrated. At an abstract level, the Hough transform represents a particular data transformation that is useful in graphics applications that maps input data to a real-valued function, and then quantizes the data for a determination as to which accumulator is incremented. Hence, the Hough transform represents an algorithm, or process, that may be furthered or performed by the present invention.

Through the specification of appropriate histogram parameters, e.g., utilizing the above-described API syntax, the Hough transform may be implemented in accordance with the present invention and is now described with further reference to FIG. 3. Thus, once the histogram parameters are appropriately set according to an appropriately defined syntax, observation data 305 may optionally be filtered by filter F5 before being forwarded to graphics processor 310. The graphics processor 310 may then take the observation data 305 and generate derivative data for use in a Hough transform calculation. At some point during the processing of this data, the graphics processor 310 may apply a function f(x) 320 to the data to map the derived data to a real-valued function that can then be quantized 330 to a histogram element in the desired range. The corresponding element in histogram 340, corresponding to the appropriate accumulator, is then incremented according to the data received as it passes through the graphics processor 310.

Alternatively, the histogram functionality may be used to aid in finding maxima in the accumulator array once the Hough accumulator data has been generated. In this case, the accumulator array(s) 305 would be computed by or transmitted to the graphics processor 310, and an iterative algorithm would compute histograms of various subsets of the arrays in order to locate maxima (or ascertain that no maxima exist) in the accumulator arrays in the regions in question.

The Hough transform is thus but one of a myriad of uses for the histogram computation mechanism of the present invention.

As mentioned above, while exemplary embodiments of the present invention have been described in connection with various computing devices and graphic architectures, the underlying concepts may be applied to any computing device or system in which it is desirable to quickly extract histogram, and/or histogram derivative data from data as it is transmitted, or streamed, through a high speed rasterization pipeline. Thus, the techniques for computing histogram data in accordance with the present invention may be applied to a variety of applications in which data is processed at very high speeds. While histogram data is useful when applied to various image processing techniques, the underlying techniques may be applied more broadly than graphics display applications. For instance, histogram data may be computed for financial data, statistical data, sample data and any other data for which some aspect of the makeup of the data is worth discovering. The data need not be displayed, but rather may be stored for later use, or output to another independent, dependent or related process. While exemplary values are chosen herein as representative of various design choices, these values are not intended to be limiting. One of ordinary skill in the art will recognize that such values are design choices that may vary from application to application depending upon the tradeoffs that are implicated. Further while particular names for software components are utilized herein for distinguishing purposes, any name would be suitable and the present invention does not lie in the particular design nomenclature utilized.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the histogram of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the histogram capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of video, image and/or audio data, one skilled in the art will recognize that the present invention is not limited thereto, and that the methods of histogram computation, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Additionally, while exposure of the histogram computation mechanism of the present invention is described above in the context of a 3-D graphics API, the invention is not so limited, and could be set by an application or other process that suitably interfaces with a graphics processor. Still further, the present invention may be implemented in or across a plurality of processing chips of a data pipeline. Therefore, the present invention should not be limited to any single embodiment, but rather should be construed in breadth and scope in accordance with the appended claims.

What is claimed:

1. A method for providing histogram computational ability in a computing system having a plurality of data sets transmitted through at least one processing chip for performing high speed data operations, comprising:

specifying, for histogram computation via a programmable histogram computation mechanism implemented by said at least one processing chip, at least one data set of said plurality of data sets; and computing at least one histogram from said specified at least one data set as said at least one data set transmits through said at least one processing chip, wherein said specifying includes specifying how to weight a count when received for addition to a histogram during said computing.

2. A method according to claim 1, wherein said computing includes applying a masking function to said at least one data set of said plurality of data sets.

3. A method according to claim 1, further including filtering said at least one data set of said plurality of data sets before said computing of said at least one histogram and before said at least one data set is transmitted through said at least one processing chip.

4. A method according to claim 1, further including reading data back from the at least one processing chip according to a histogram reading back method call of said programmable histogram computation mechanism.

5. A method according to claim 1, wherein said computing includes:

mapping said at least one data set to at least one real-valued function data set; and quantizing said at least one real-valued function data set.

6. A method according to claim 1, wherein said specifying includes specifying at least one state of said at least one histogram.

7. A method according to claim 1, further including storing said at least one histogram computed from said at least one data set in at least one array.

8. A method according to claim 1, wherein said specifying includes specifying via a three dimensional graphics application programming interface.

9. A computer readable medium comprising computer executable instructions for performing the method of claim 1.

10. A computing device comprising means for performing the method of claim 1.

11. A computer readable medium having stored thereon a plurality of computer-executable modules, the computer executable modules comprising:

a histogram computation specification mechanism for specifying at least one data set to be operated upon by at least one processing chip, wherein said histogram computation specification mechanism includes a mechanism for specifying a reset of a histogram computer, wherein the histogram element values for a histogram specified are initialized;

wherein said at least one chip includes a programmable histogram computation mechanism for computing, based upon a specification according to said histogram computation specification mechanism, at least one histogram from said at least one data set as said at least one data set is transmitted through said at least one chip during processing of said at least one data set in connection with a high precision data pipeline.

12. A computer readable medium according to claim 11, wherein said histogram computation specification mechanism includes a mechanism for specifying a masking function to be applied to said at least one data set by said at least one chip.

13. A computer readable medium according to claim 11, wherein said histogram computation specification mechanism includes a mechanism for specifying how to weight a count when received for addition to a histogram during said computing.

14. A computing device comprising the computer readable medium of claim 11.

15. An application programming interface, stored as computer-executable instructions on a computer readable medium, for specifying at least one histogram to be computed from at least one data set as said at least one data set is transmitted through a high precision data pipeline, comprising:
- a histogram computation specification mechanism for specifying at least one data set to be operated upon by at least one processing chip of said high precision data pipeline, wherein said histogram computation specification mechanism includes a mechanism for specifying a reset of a histogram computer, wherein the histogram element values for a histogram specified are initialized according to a pre-defined function;
- wherein said at least one chip include a programmable histogram computation mechanism for computing, based upon a specification according to said histogram computation specification mechanism, at least one histogram from said at least one data set as said at least one data set is transmitted through said at least one chip during processing of said at least one data set.

16. An application programming interface according to claim 15, wherein said histogram computation specification mechanism includes a mechanism for specifying a masking function to be applied to said at least one data set by said at least one chip.

17. An application programming interface according to claim 15, wherein said histogram computation specification mechanism includes a mechanism for specifying how to weight a count when received for addition to a histogram during said computing.

* * * * *